F. G. BAKES.
Broom Head.
No. 56,162.
Patented July 10, 1866.
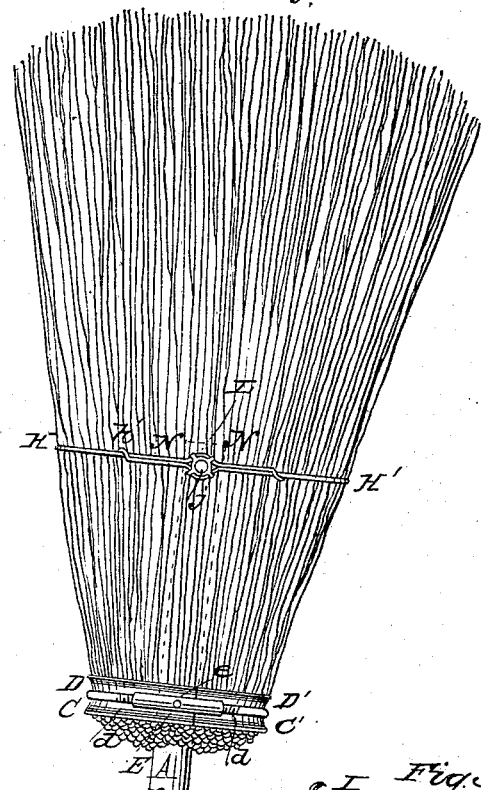
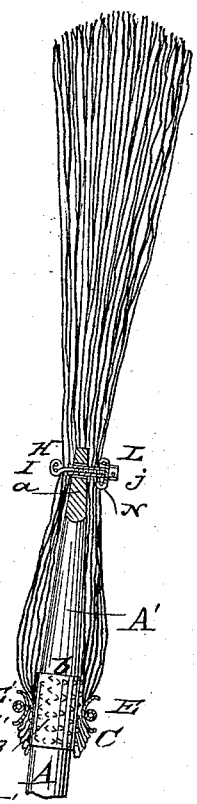
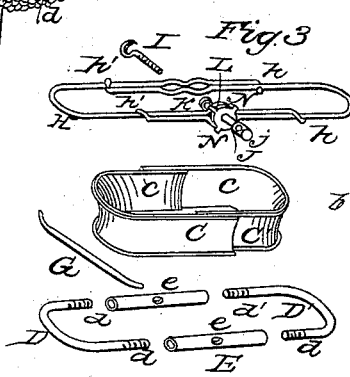
Witnesses
James H. Layman
Henry G. Webber
Inventor
F. G. Bakes
By Kuyho Bin
atty

UNITED STATES PATENT OFFICE.

FREDERICK G. BAKES, OF VEVAY, INDIANA.

IMPROVED BROOM-HEAD.

Specification forming part of Letters Patent No. 56,162, dated July 10, 1866.

*To all whom it may concern:*

Be it known that I, FREDERICK G. BAKES, of Vevay, Switzerland county, and State of Indiana, have invented certain new and useful Improvements in Broom-Heads; and I do hereby declare the following to be a full, clear, and exact description thereof, reference being had to the accompanying drawings, making part of this specification.

My invention relates to a light, simple, and cheap elastic broom head or clamp, which is arranged in such a manner as to be easily attached to an ordinary wooden handle, and to be removed therefrom in a few minutes whenever it is desired to replenish the clamp with new broom-corn.

My improvement has been designed principally for the benefit of farmers, who, having a supply of the corn constantly on hand, are enabled to furnish themselves with a new broom whenever one becomes worn out, as my elastic broom-head can be used for years and is furnished at a mere nominal cost.

In the accompanying drawings, Figure 1 is a side elevation of a finished broom bound together by my improved head or clamp. Fig. 2 is a transverse vertical section of the same; and Fig. 3 is a perspective view of the different parts constituting my broom-head in a detached condition.

A is an ordinary wooden handle, having a tapering portion, A', which is surrounded by the broom-corn, and said tapering portion is provided near its extremity with an aperture, $a$, for the reception of the cylindrical nut J of the binding device H H'.

B is a small cylinder of tin or other suitable sheet metal, and is provided with a number of outwardly-projecting barbs, $b$ $b$, said barbs serving to prevent the corn from twisting around the handle of the broom.

The tube B may be attached to the handle A in any suitable manner, either by screws, tacks, or by simply forcing one or more inwardly-projecting barbs into the handle by means of a small punch or nail.

My broom-head is composed of three distinct duplicate parts, C C', D D', and E E', of which the members C C' are of sheet metal, the ones D D' of stiff wire, and the remaining parts, E E', are small screw-threaded tubes.

The sheet-metal parts C C', which I term the "yoke," are so constructed as to have an interior convex surface, $c$ $c'$, and the heads of the broom-corn are inserted in this yoke, the convexity of which serves to retain the corn in its proper position. The ends of the parts C C', when placed in position so as to compose the yoke, break joints, as clearly shown in Fig. 3.

The clamp proper consists of two recurved wires, D D', and the ends $d$ $d$ of the wire D have right-hand screws cut upon them, while the ends $d'$ $d'$ of the other wire, D', are provided with left-hand screws.

The tubes E E' are screw-threaded in such a manner as to receive the right and left handed screws $d$ $d$ and $d'$ $d'$, and each tube is provided with two opposite apertures, $e$ $e'$, for the insertion of a wrench, G.

In order to preserve the broom in a proper shape and condition for use, I provide two binding-wires, H H', which are connected to the handle A, near its end, by means of the screw-threaded hook I and cylindrical nut J, the hook being screwed into the nut, and the latter passing through the aperture $a$ of the broom-handle. (See Fig. 2.)

The external end of the cylindrical nut J is provided with a head, $j$, having an aperture, in which the end of the wrench G is inserted whenever it is desired to tighten up or unslack said nut; or, if preferred, the nut may have a slot in it, and be operated by a common screw-driver.

The inner end of the nut J has a flange, K, which prevents the nut from being disconnected from the binding-wires H H'. The cylindrical nut J is connected to the binding-wires H H' by the following device: L is a circular washer or disk having a central aperture through which the nut J passes, and said washer is provided with a number of lugs, N N, which embrace and hold securely in position one side of the binding-wires H H, while the opposite side of the wires is retained by the screw-threaded hook I, as clearly shown in Fig. 2.

The ends of the wires H H' are hooked at $h$ $h$ and $h'$ $h'$, so as to engage with one another, thereby producing a secure and at the same time an elastic binding attachment.

My broom-head is filled with corn in the following manner: The barbed sheet-metal cylinder B is first attached to the handle A at any position, depending upon the shape which it is desired to give the broom, and the yoke C C' is opened as far as the wires D D' will allow without uncoupling said wires from the screw-threaded tubes E E'. The handle A is then held in a position equidistant from the extended yoke C C', and the space between the said yoke and cylinder B is completely filled with broom-corn, after which the screw-threaded tubes E E' are rotated by means of the wrench G, thus clamping the broom-corn to the handle in the most secure immovable manner. This being done, the binding-wires H H' are placed around the broom-corn, near the end of the tapering portion of the handle; and the cylindrical nut J being inserted in the aperture $a$, and the screw-threaded hook I being caused to engage with said nut J, the latter is turned with the wrench G, by which means the binding-wires are firmly attached to the handle. The heads of the broom-corn which protrude through the yoke C C' are now trimmed with a knife, so as to present a symmetrical shape, and the operation of making the broom is completed.

I claim herein as new and of my own invention—

1. A broom head or clamp composed of the parts C C', D D', and E E', all combined, arranged, and operating substantially as set forth.

2. In combination with the binding-wires H H', the screw-threaded hook I, cylindrical nut J, and washer K, substantially as described, and for the purpose set forth.

3. In combination with the elements of the two foregoing claims, the barbed sheet-metal cylinder B, for the purpose described and explained.

In testimony of which invention I hereunto set my hand.

FREDERICK G. BAKES.

Witnesses:
GEO. H. KNIGHT,
JAMES H. LAYMAN.